Nov. 19, 1968 R. M. HELLER ET AL 3,412,380

TWO-CHARACTER, SINGLE ERROR-CORRECTING SYSTEM COMPATIBLE WITH TELEGRAPH TRANSMISSION

Filed Sept. 4, 1964 3 Sheets-Sheet 1

Nov. 19, 1968 R. M. HELLER ET AL 3,412,380

TWO-CHARACTER, SINGLE ERROR-CORRECTING SYSTEM COMPATIBLE WITH TELEGRAPH TRANSMISSION

Filed Sept. 4, 1964 3 Sheets-Sheet 3

United States Patent Office 3,412,380

Patented Nov. 19, 1968

3,412,380

TWO-CHARACTER, SINGLE ERROR-CORRECTING SYSTEM COMPATIBLE WITH TELEGRAPH TRANSMISSION

Ralph M. Heller, Baltimore, James R. Bowen, Catonsville, and John L. Corley, Hyattsville, Md., assignors to Westinghouse Electric Corporation, East Pittsburgh, Pa., a corporation of Pennsylvania Filed Sept. 4, 1964, Ser. No. 394,432
5 Claims. (Cl. 340—146.1)

ABSTRACT OF THE DISCLOSURE

Apparatus and method for replacing the start-stop bits of a normal Teletype channel with coding bits such as parity check bits. Since the parity check bits are placed where start and stop bits were originally positioned in the bit stream, there is no change in information or actual transmission rates. Simple error correcting codes are inserted in a two character word to provide information to enable a correction to be made to an erroneous bit. The five bit-Teletype characters appear in the same form and bit locations as an uncoded transmission.

The present invention relates generally to digital data systems and more particularly relates to apparatus and method for coding and decoding information for Teletype character transmission.

The Teletype character is generally comprised of five information bits. In the time divided sequence of bits in a transmission stream, a start bit proceeds and a stop bit follows each character. When coding a Teletype channel for error correction or error detection, quite often the original Teletype format is changed and then has to be reconstructed. That is, additional bits may be added or the Teletype character is rearranged in such a manner that each character must be reconstructed at the receiver. This is not ideal for transmission of encrypted messages. If additional bits have been added for coding then the timing must be adjusted to either speed up the bit rate to allow for the coding bits, or to slow down the information reception rate. Further, such an encoded transmission can only be received by a receiver with a decoder. In order to continuously operate a reliable channel, spares are needed so that when an equipment failure is noticed, a spare decoder can be immediately switched in while repairs are made.

An object of the present invention is to provide apparatus for coding and decoding without complex or costly modifications and additions to the original Teletype system.

Another object of the present invention is to provide apparatus for improving message reliability.

Another object of the present invention is to provide apparatus permitting the use of a normal Teletype receiver without a decoding section when, for example, the decoder section has failed.

Another object of the present invention is to provide extra error protection in channel sensing by providing apparatus allowing simultaneous operation of the encoded transmission into a decoder and into a normal Teletype printer for comparing the two received messages bit by bit.

Another object of the present invention is to provide apparatus and method for correcting a transmission error and reconstituting both the start bit and the stop bit to preserve the Teletype format.

These and other objects are attained by the present invention by providing apparatus and method for replacing the start and stop bits of a normal Teletype channel with coding bits such as parity check bits. Since the parity check bits are placed where start and stop bits were originally positioned in the bit stream, there is no change in information or actual transmission rates. The five bit-Teletype characters appear in the same form and bit locations as an uncoded transmission. At the receiver a decoder corrects the error and reconstitutes the Teletype format.

Further objects and advantages of the present invention will be readily apparent from the following detailed description taken in conjunction with the drawings, in which.

Figure 1:
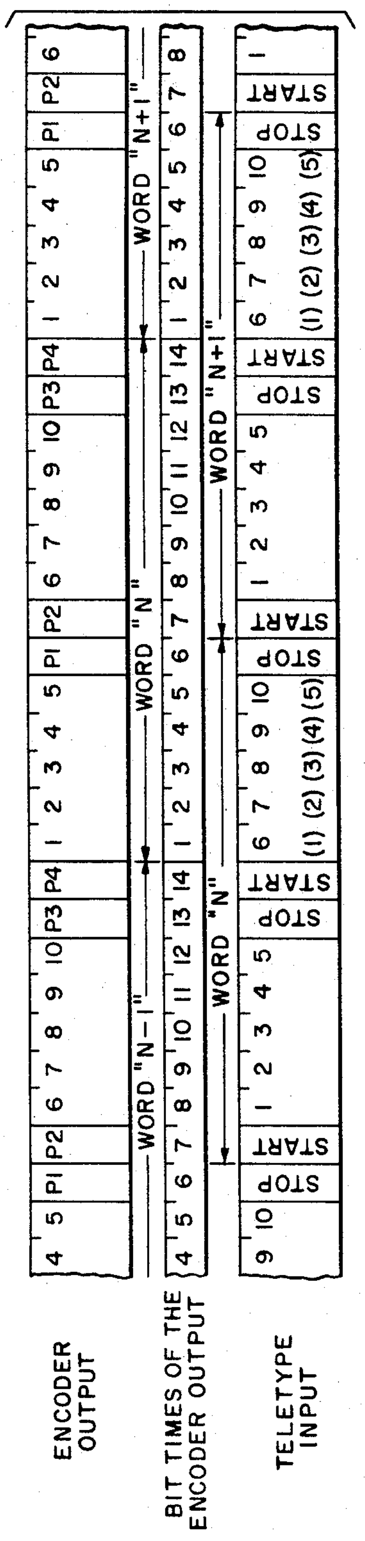
FIGURE 1 is a data format of an encoder presented for a clearer understanding of the present invention.

As mentioned previously, a Teletype character of five information bits is conventionally preceded by a start bit and followed by a stop bit. For purposes of this illustration, two characters and their associated start bits and stop bits are herein defined as a word. An encoder in accordance with the present invention operates on a ten bit, two Teletype character, information input and adds four code bits for single random error correcting coding of the Teletype characters to produce a fourteen bit coded word which goes out into the channel with the four check bits placed where the start and stop bits were in the Teletype data format. The correction of a single random error in a fourteen bit coded word can be readily accomplished by shortened cyclic Hamming Code techniques as discussed by W. Wesley Peterson in Chapter 8 and more particularly page 154 of "Error-Correcting Codes" published jointly by the M.I.T. Press and John Wiley & Sons, Inc., 1961.

A brief explanation of the principles involved and the code bits which are utilized will now be provided.

To determine the check bits assume, for the purpose of clarity, a simplified encoder and that the ten input information bits are located in the first ten bit positions and have the space and mark or zero and one designation as follows:

| Bit position | 1 | 2 | 3 | 4 | 5 | 6 | 7 | 8 | 9 | 10 |
|---|---|---|---|---|---|---|---|---|---|---|
| | 1 | 0 | 1 | 0 | 0 | 1 | 1 | 0 | 1 | 0 |

If the encoder has a linear sequential circuit consisting of four Flip-Flops designated as 1, 2, 3, and 4, the states of the encoding linear sequential circuit will be

| (LSC F-F stages) | 1 | 2 | 3 | 4 |
|---|---|---|---|---|
| Start | 0 | 0 | 0 | 0 |
| 1 | 1 | 1 | 0 | 0 |
| 2 | 0 | 1 | 1 | 0 |
| 3 | 1 | 1 | 1 | 1 |
| 4 | 1 | 0 | 1 | 1 |
| 5 | 1 | 0 | 0 | 1 |
| 6 | 0 | 1 | 0 | 0 |
| 7 | 1 | 1 | 1 | 0 |
| 8 | 0 | 1 | 1 | 1 |
| 9 | 0 | 0 | 1 | 1 |
| 10 | 1 | 1 | 0 | 1 |

At the end of the first ten clock pulse counts, the check bits have been generated and they are defined by the states of Flip-Flops 1, 2, 3 and 4. On the four next counts the bits in the linear sequential circuit after count ten are added to the ten information bits. Thus, the output word from the simplified encoder is:

| Bit position | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| | 1 | 0 | 1 | 0 | 0 | 1 | 1 | 0 | 1 | 0 | 1 | 0 | 1 | 1 |

At the opposite end of the channel at the receiver a simplified decoder will be considered as including four Flip-Flops 1′, 2′, 3′ and 4′ in a decoding linear sequential circuit.

It tnere were no errors in the transmission of the word in the previous example the states in the decoding linear sequential circuit would be as follows after the various clock pulse counts:

| (LSC′ F-F stages) | 1′ | 2′ | 3′ | 4′ |
|---|---|---|---|---|
| Start | 0 | 0 | 0 | 0 |
| 1 | 1 | 0 | 0 | 0 |
| 2 | 0 | 1 | 0 | 0 |
| 3 | 1 | 0 | 1 | 0 |
| 4 | 0 | 1 | 0 | 1 |
| 5 | 1 | 1 | 1 | 0 |
| 6 | 1 | 1 | 1 | 1 |
| 7 | 0 | 0 | 1 | 1 |
| 8 | 1 | 1 | 0 | 1 |
| 9 | 0 | 0 | 1 | 0 |
| 10 | 0 | 0 | 0 | 1 |
| 11 | 0 | 1 | 0 | 0 |
| 12 | 0 | 0 | 1 | 0 |
| 13 | 1 | 0 | 0 | 1 |
| 14 | 0 | 0 | 0 | 0 |

The state of 0000 after the fourteenth clock pulse count indicates that no error occurred in the transmission of the word through the channel.

Suppose, instead, that the ninth bit was erroneously received, the input word to the decoding linear sequential circuit would then be:

| Bit position | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| | 1 | 0 | 1 | 0 | 0 | 1 | 1 | 0 | 0 | 0 | 1 | 0 | 1 | 1 |

The states in the decoding LSC′ will then be:

| (LSC′ F-F stages) | 1′ | 2′ | 3′ | 4′ |
|---|---|---|---|---|
| Start | 0 | 0 | 0 | 0 |
| 1 | 1 | 0 | 0 | 0 |
| 2 | 0 | 1 | 0 | 0 |
| 3 | 1 | 0 | 1 | 0 |
| 4 | 0 | 1 | 0 | 1 |
| 5 | 1 | 1 | 1 | 0 |
| 6 | 1 | 1 | 1 | 1 |
| 7 | 0 | 0 | 1 | 1 |
| 8 | 1 | 1 | 0 | 1 |
| 9 | 1 | 0 | 1 | 0 |
| 10 | 0 | 1 | 0 | 1 |
| 11 | 0 | 1 | 1 | 0 |
| 12 | 0 | 0 | 1 | 1 |
| 13 | 0 | 1 | 0 | 1 |
| 14 | 0 | 1 | 1 | 0 |

Since the state of the linear sequential circuit is not 0000 at the end of the fourteenth clock pulse count, an error in transmission is indicated.

The subsequent states in the linear sequential circuit during the error location phase are:

| | 1′ | 2′ | 3′ | 4′ |
|---|---|---|---|---|
| Start | 0 | 1 | 1 | 0 |
| (15) 1 | 0 | 0 | 1 | 1 |
| (16) 2 | 1 | 1 | 0 | 1 |
| 3 | 1 | 0 | 1 | 0 |
| 4 | 0 | 1 | 0 | 1 |
| 5 | 1 | 1 | 1 | 0 |
| 6 | 0 | 1 | 1 | 1 |
| 7 | 1 | 1 | 1 | 1 |
| 8 | 1 | 0 | 1 | 1 |
| 9 | 1 | 0 | 0 | 1 |

The appearance of 1001 in the linear sequential circuit during the error location phase indicates that that bit is in error. Since 1001 appears during the ninth clock pulse count of the error location phase, the error is in bit nine. At this time, the ninth bit will just be emerging from the store of the decoder and can be complemented for correction.

The application of the principles involved to operation of a system of complete encoding and decoding circuits is illustrated by the drawing.

Figure 2:
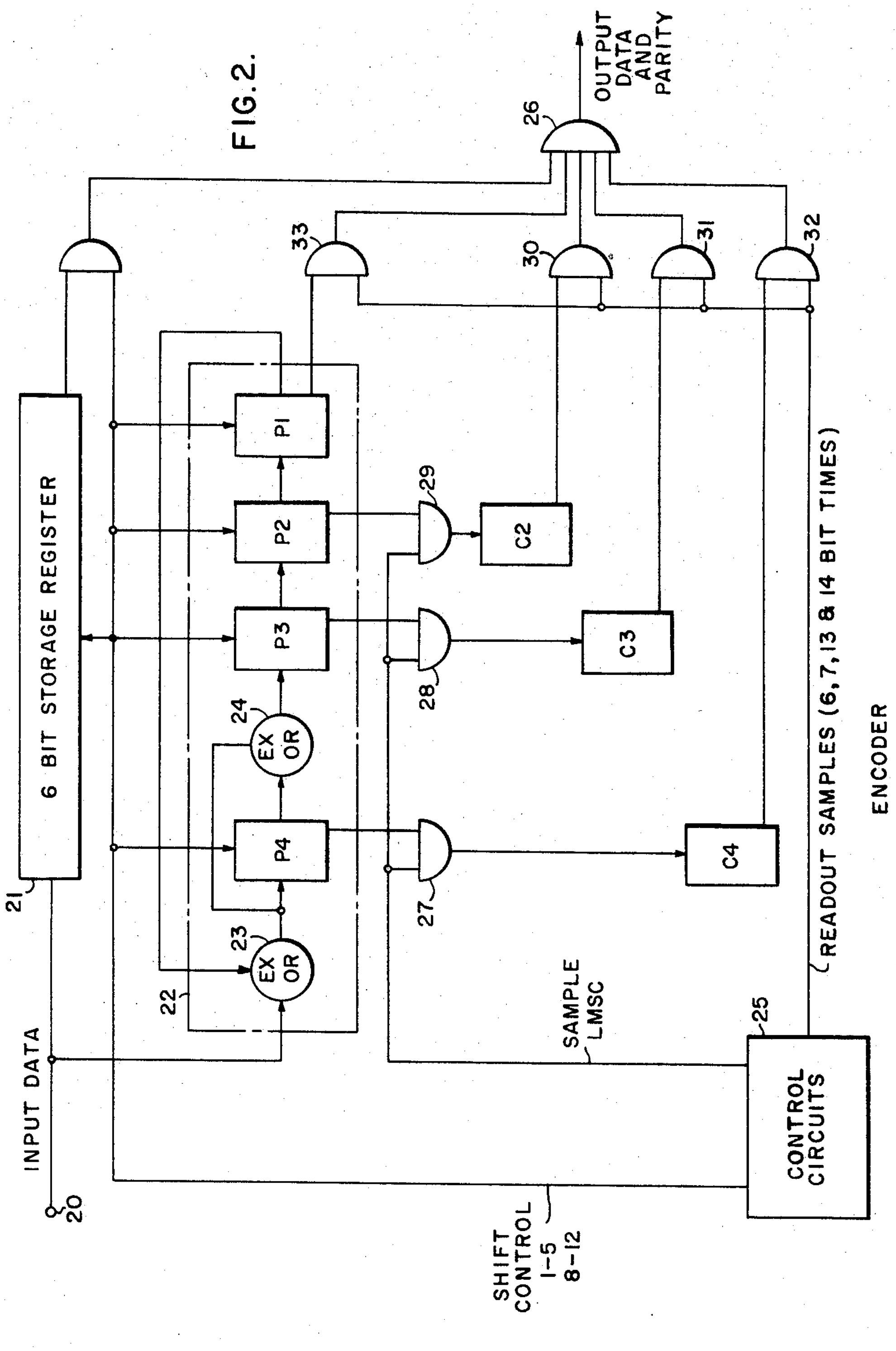
FIG. 2 is a block diagram of an illustrative embodiment of the present invention embodied in an encoder.

More specifically, FIG. 1 illustrates an actual Teletype input word N of two characters and their start and stop bits and the output of the word N from an encoder in accordance with the present invention. The encoder accepts the Teletype data and replaces the start-stop bits in the data stream now located at bit times 6, 7, 13 and 14 in an actual transmission with partity check bits P1, P2, P3 and P4. These parity check bits provide the information required for error detection and correction at the decoder. The encoder is shown in FIG. 2.

The bit stream of input data is received at 20 and directed into a six bit storage register 21 as well as an encoding linear sequential circuit 22. In operation, the first five information bits are shifted into the six bit shift register 21. As each bit is sampled by the shift register, it is also sampled by exclusive OR gate 23 in the linear sequential circuit 22. The linear sequential circuit 22 computes the parity check information during each information bit time. See Chapter 8, Peterson, "Error-Correcting Codes," supra. Each Flip-Flop in the circuit 22 is identified by the particular parity bit check it generates, namely P4, P3, P2 and P1. A control circuit 25 provides a shift control signal during the first five bit times and the eighth through twelfth bit times so that the information bits being received will be shifted into the register 21 as well as the linear sequential circuit 22. After each word, that is, during bit time 6, the control circuit 25 enables AND circuits 27, 28 and 29 to store a parity check bit in each of the storage memories C4, C3 and C2. From there they are gated to the output OR gate 26 of the encoder by readout sample signals from control circuit 25 occurring at AND circuits 30, 31, 32 and 33. The parity bit check P1 stored in the Flip-Flop P1 of the circuit 22 is enabled at the sixth bit time and accordingly no storage is necessary for placing that bit on the output line of the encoder. During bit time seven control circuit 25 enables AND gate 30, thereby placing parity check bit P2 on the output line.

Referring now to FIG. 1, during the stop bit of the first Teletype character and the start bit of the second Teletype character of word N of the Teletype input data, the check bits P3 and P4 are transmitted out of the encoder for the preceding word *N*—1. During input time 1, 2, 3, 4 and 5 of the word time N of the encoder output, the sixth, seventh, eighth, ninth and tenth information bits are sampled from the Teletype input. During the same bit times the first five bits of the output information are transmitted through the output OR gate 26 to the output channel. Then during bit times six and seven of the encoder output, the parity check bit computation is complete in the linear sequential circuit 22. The parity bit P1 in the Flip-Flop P1 is gated directly to the output channel during bit time six. Parity bits P2, P3 and P4 are captured and stored in the storage devices C2, C3 and C4 respectively. Then during bit time seven the content of storage C2 is gated out to the output. Parity bits P3 and P4 are held in the Flip-Flops C3 and C4 and are transmitted to the output channel during the bit times 13 and 14 of the encoder output. Thus, the output of the word N from the encoder lags the input of the word N by one full Teletype character.

Figure 3:
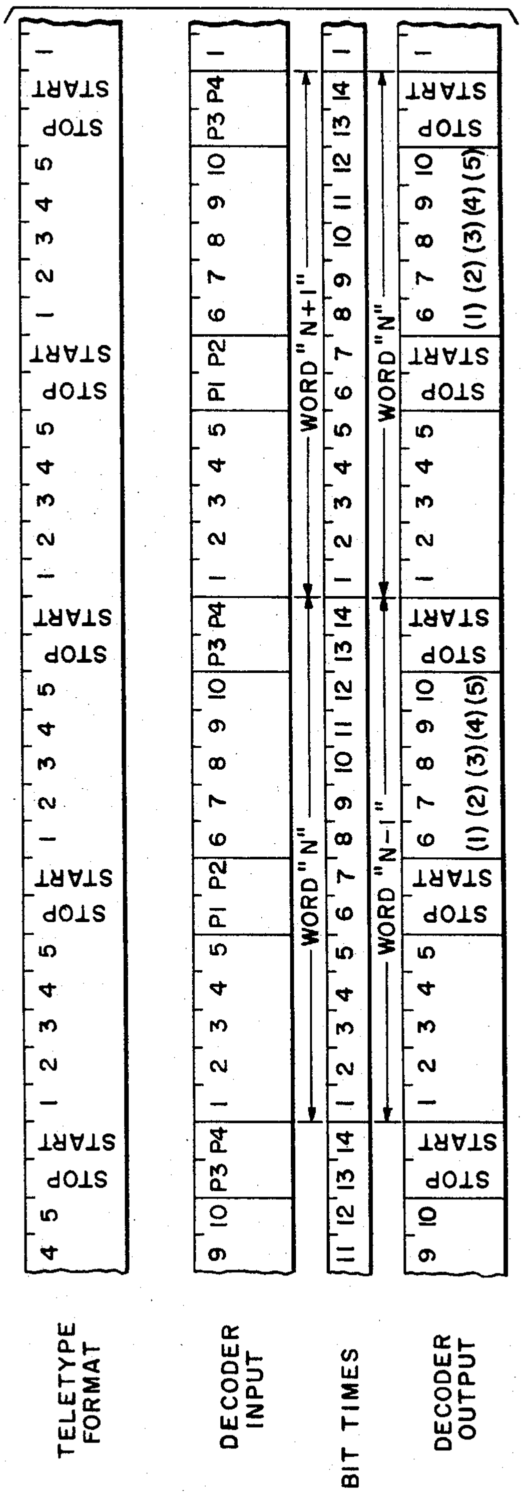
FIG. 3 is a data format for a decoder presented for a clearer understanding of the present invention.

FIG. 3 illustrates the input to the decoder and its related teletype output character. The word N with its parity bits is disposed for receipt of the decoder during the bit times 1 through 14. The decoder must store the ten information bits until the error location phase and accordingly the output from the decoder of the word N occurs during the following 14 bit times.

Figure 4:
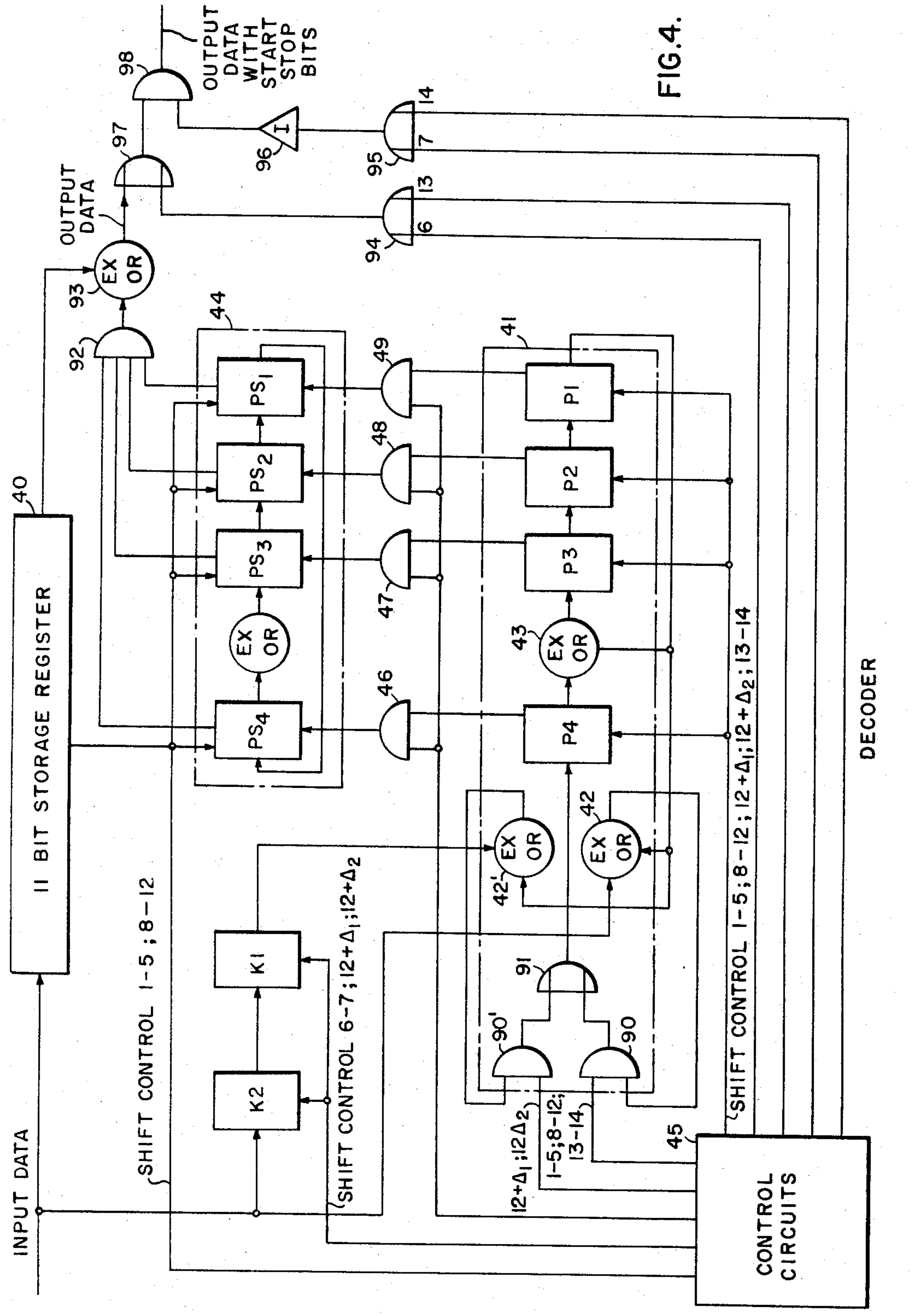
FIG. 4 is a block diagram of an illustrative embodiment of the present invention in a decoder.

Referring to FIG. 4, the first five information bits are shifted into an 11 bit shift register 40. Each time an information bit is received it is also sampled by a linear sequential circuit 41. The first five bits enter four Flip-Flops P4, P3, P2 and P1 through two exclusive OR circuits 42 and 43, upon control circuit 45 enabling AND "GATE 90 and OR" GATE 91. The Flip-Flops are again identified with respect to their associated parity bit. When the parity check bits P1 and P2 are received during bit times 6 and 7 they are captured and stored in the two parity storage circuits K2 and K1. Then the next 5 information bits are received, checked and stored. After the tenth bit has been sampled by the linear sequential circuit 41, the first two parity bits P1 and P2, which were captured and stored, are sampled by the linear sequential circuit 41 through the enabling of AND gate 90′ and OR gate 91. Then, the parity check bits P3 and P4 are received during the 13th and 14th bit times and sampled by the linear sequence circuit 41. At this time the parity check is complete. If no error has occurred, the contents of the linear sequence circuit 41 will be equal to binary 0000. The contents of the first linear sequential circuit 41 is then transferred to a second linear sequential circuit 44 which determines if an error has occurred. The parity check bits contained in the linear sequence circuit 41 are transferred to the linear sequence circuit 44 upon enabling signals from a control circuit 45 energizing the AND elements 46, 47, 48 and 49 connecting the Flip-Flops of the first linear sequential circuit to the Flip-Flops of the second linear sequential circuit 44. Then during the shift of the information of the 11 bit storage register to the output Teletype device, the second linear sequential circuit 44 determines if an error has occurred. The circuit 44 will cause the correction to be made, if required, to any bit which may be in error during that bit time. For example, if an error has occurred in the ninth bit time as previously suggested, that information bit will be changed during the time at which the content of the second linear sequential circuit 44 equals binary 1001. This state is detected by "AND" circuit 92 and circuit 93 changes the output of circuit 40 if 1001 appears at the input to circuit 92.

Hence, it is readily apparent that the five bit Teletype characters actually appear in the same form as the bit locations as they had prior to being coded for transmission. The start and stop bits are reconstructed at the output by circuits 94, 95, 96, 97 and 98. The start bit is reconstructed during bit times 7 and 14. Bit times 7 or 14 activate the OR gate 95 and inverter 96. Circuit 96 forces the output of circuit 98 to be a start. The stop bit is reconstructed during bit times 6 and 13. Bit times 6 or 13 activate the OR gates 94 and 97. Circuit 97 forces the output of circuit 98 to be a stop. Thus, operation of an encoded Teletype into ordinary Teletype receivers without the decoding apparatus could be accomplished. If a decoder has failed, the system would still be capable of operation. Of course, the error correcting coding would then be lost but the information bits would still be transmitted in accordance with the conventional practice. All that is necessary is the synchronization of the encoder with the decoder so that the clock pulse count or bit times can be recognized.

While the present invention has been described with a degree of particularity for the purposes of illustration, it is to be understood that all alterations, modifications and equivalents within the spirit and scope of the present invention are herein meant to be included. For example, while parity bits have been stated as inserted during the start and stop bits, it is to be understood that any suitable error detecting-error correcting coding information may be so inserted.

We claim as our invention:

1. In a Teletype transmission system for five bit characters each preceded by a start bit and followed by a stop bit; the combination comprising; means for stripping the start bit and stop bit of each character; means for encoding each character to provide simple error correcting coding bits; and means for inserting said coding bits in the bit stream in place of the start bits and stop bits.

2. In a transmitter of a Teletype transmission system for binary bits in a bit stream, seven bits in a set including a start bit, five information bits, and a stop bit, two sets being grouped as a word of fourteen bits; the combination comprising; a six bit shift register; means for storing each information bit in said shift register; means for sampling each information bit to compute a parity check bit during each information bit time; means for transmitting the first five information bits to an output channel during the same bit times that the second five information bits are sampled; means for gating the first parity bit during the bit time of the stop bit of the first character; means for gating a second parity bit into the bit stream output in place of the start bit of the second character; and means for transmitting a third parity bit and fourth parity bit during bit times 13 and 14 of the encoder output.

3. In a receiver of a Teletype transmission system for binary bits in a bit stream, seven bits in a set including five information bits followed by two error detecting code bits, two sets being grouped as a word of fourteen bits, the combination comprising; a shift register for storage of the information bits of a word; means for storing the code bits received immediately after the first five information bits of a word; a first linear sequential circuit for sampling the ten information bits received by said register; means for transferring the stored code bits to said first circuit immediately after receiving said ten information bits; said first circuit thereafter receiving the remaining code bits of the word during bit times 13 and 14; a second linear sequential circuit; means for transferring the contents of said first circuit when containing the four code bits of a word to said second circuit; and means for comparing the code bits stored within said second circuit to the information bits stored within said register and correcting any information bit incorrectly received.

4. In a Teletype transmission system wherein a Teletype character has five information bits preceded by a start bit and followed by a stop bit, the combination comprising; input means for receiving a bit stream of Teletype information; means for stripping the start-stop bits from each Teletype character; means for storing the five information bits of the Teletype character; means for computing a parity check on a fixed sequence of Teletype characters in the information stream; means for inserting a parity bit check on said Teletype character during the bit times where the start bit and stop bit were previously located in the information bit stream; means for receiving the reconstituted information bit stream; means for sampling each bit as it is received; means for storing the parity bits inserted during the bit times where the start and stop bits originally were located and means for reading out the Teletype character bits and correcting the bits as they emerge in accordance with a comparison of the stored parity check bits and the bits stored within the shift register for readout.

5. The apparatus of claim 4 wherein said fixed or predetermined sequence of Teletype character is a two character sequence.

References Cited

UNITED STATES PATENTS

| | | | |
|---|---|---|---|
| 2,713,084 | 7/1955 | Berwin | 178—23 |
| 3,227,999 | 1/1966 | Hagelbarger | 340—146.1 |

MALCOLM A. MORRISON, *Primary Examiner.*

C. E. ATKINSON, *Assistant Examiner.*